United States Patent Office 3,605,793
Patented Sept. 20, 1971

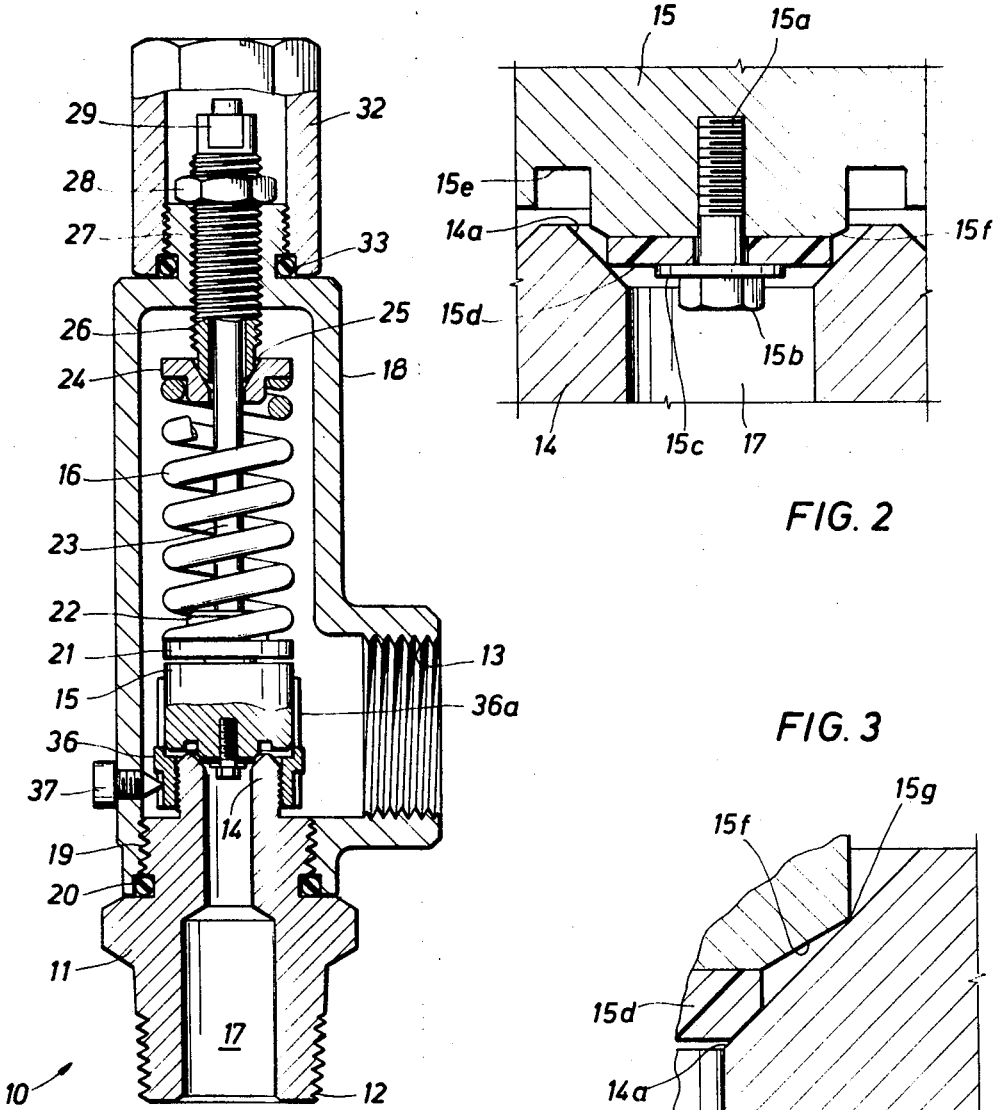

3,605,793
SAFETY RELIEF VALVE
John W. Kinsel, 4040 Southwest Freeway, Suite 235
Houston, Tex. 77027
Filed July 18, 1969, Ser. No. 842,947
Int. Cl. F16k 1/52, 15/02
U.S. Cl. 137—329.06          2 Claims

ABSTRACT OF THE DISCLOSURE

For use in a safety relief valve which incorporates a hollow body having therein a valve seat and a valve member which closes a passage through the valve seat, an improvement which includes a plastic seal carried on said valve member and adapted to be contacted against said valve seat, the valve seat being tapered at a predetermined angle with respect to the valve body and bearing against the plastic seal with a similar but differently inclined taper on the valve body immediately adjacent and behind the valve seal to provide a line of contact and closure when the plastic seal bears against the seat and a secondary but equally effective line of closure by the differently tapered valve member immediately to the rear of the seal so that wear of the seal does not effect the operation of the valve.

RELATED APPLICATIONS

Applicant has no presently pending related applications.

SUMMARY OF PROBLEM AND SOLUTION

Pressure safety or pop-off valves are commonly used with many pressure vessels and pressure lines. Typically they incorporate a hollow body which surrounds a valve seat and a valve member is forced into the valve seat by means of a spring. The point of contact is basically the valve seat bearing against the valve member. As would be expected, the loading is severe and in instances of heavy service, as with exceedingly high pressures or temperatures and in the presence of corrosives, typically the pressure fluid, the points of wear include the valve seat and the valve member. As a means of easy service, the present invention incorporates a plastic seal or ring carried on the valve member which contacts the valve seat. The plastic seal is a removable device. Hence, in case of wear, it may be readily removed and replaced with a measurable degree of ease and facility to thereby maintain and service the safety valve of the present invention. More importantly, the present invention will continue its quality operation after the plastic seal has worn and become truncated. A tapered but specially inclined lip or edge on the valve body which contacts the valve seat to provide a secondary line of closure for the valve. As will be described, the worn plastic seal ring will permit the valve member to bear directly on the valve seat and the tapered periphery or edge contacts the valve seat to create a secondary line of closure of the valve. Hence, wearing of the plastic seal is not deleterious of the safety function of the valve and a back-up means is provided to keep the valve in service long after the plastic seal ring has worn.

Other objects and advantages of the present invention will become more readily apparent from a consideration of the written specification hereinafter in conjunction with the drawings, wherein:

FIG. 1 is a sectional view through a safety valve incorporating the features of the present invention;

FIG. 2 is an enlarged sectional view through the seat of the valve of FIG. 1 disclosing the plastic seal and tapered valve member of the present invention; and, FIG. 3 is a portion of FIG. 2 further enlarged to show wear of the plastic seal and contact of the valve body against the valve seat to show the secondary line of closure to keep the valve in operation after wear of the replaceable plastic seal.

In the drawings, attention is first directed to FIG. 1 where the numeral 10 indicates a pop-off or safety valve incorporating the present invention. The safety valve 10 incorporates a tubular body 11 which has a threaded inlet 12 and a laterally directed outlet 13. The numeral 14 indicates a valve seat and the numeral 15 indicates the valve member which is placed in the valve seat to close the passage of communication through the valve. The valve member 15 is moved by a suitable spring 16 which closes the valve. Briefly, the inlet 12 is connected with a pressure vessel, high pressure line, or other source of pressure fluid. The pressure acts through the tubular body 11 on the valve member 15 which is forced against the valve seat 14 by the spring 16. When the pressure is sufficiently great in the valve, the valve member 15 is forced from its seat 14 and pressure fluid is vented through the outlet passage 13 to relieve the pressure vessel at a controlled rate. As will be understood, this provides a safety function in that the valve only opens at a predetermined or ascertained pressure and closes once the pressure is lowered sufficiently. The general operation of the valve described hereinabove should be kept in view in considering the novel features of the present invention as will be described in detail.

Considering the valve 10 in greater detail, the valve body 11 incorporates a threaded lower exterior which is adapted to be connected with a suitable coupling communicating the valve with pressure fluid. Once the connection is made fast, the axial passage 17 is communicated with the pressure fluid and the pressure fluid acts on the valve member 15 as noted above. The cylindrical body 11 is threadedly engaged with a tubular valve bonnet 18 which encloses the spring 16 and the various support pieces as will be described. The valve bonnet 18 is threadedly engaged with the valve body 11 at 19 and a suitable sealing O-ring 20 is captured between the two members 11 and 18 to prevent leakage through the threads 19. The valve bonnet 18 is generally symmetrical except for the outlet port 13 which is an internally threaded laterally directed opening of substantial diameter for venting to atmosphere or to a collection line the pressure fluid released by the safety valve 10.

The valve member 15 is essentially a cylindrical solid member. A washer 21 and concentric collar piece 22 engage the coil spring 16. The coil spring 16 surrounds the collar 22 of reduced diameter and a valve stem 23. The upper end of the spring 16 bears against a flanged washer 24 having a tapered internal seat 25 which bears against a concentrically arranged threaded adjustment sleeve 26. The member 21 may be similar to the washer 24 which is shown in greater detail by virtue of the sectional view taken therethrough. It will be understood that the internal flange protrudes into the spring 16 and captures the upper flite of the spring so as to align the coil spring about the valve stem 23 and to maintain the axial force desired of the spring acting on the valve body.

A threaded sleeve 26 threadedly engages the neck 27 at the upper end of the valve bonnet 18. The neck is of reduced diameter and a number of threads engage the sleeve 26. The threaded sleeve is shown protruding from the neck 27 and a suitable lock nut 28 captures the sleeve 26 and is adapted to be used to capture the sleeve 26 at a particular location with respect to the valve bonnet 18. More particularly, the threaded sleeve protrudes above the lock nut 28 and incorporates suitable wrench flats at 29 so that it may be engaged with a hand tool to adjust upwardly or downwardly as desired.

As shown in the drawings, the valve stem 23 extends through an axial passage in the threaded sleeve 26, and is not engaged thereby. The threaded sleeve 26 is adjusted upwardly or downwardly through the use of the wrench flat 29 to position the flanged washer 24 at a differnt elevation within the valve bonnet 18. The upwardly and downwardly adjustment of the threaded sleeve 26 adjusts the tension in the coil spring 16 to thereby adjust the opening pressure of the valve 10. For instance, if the valve 10 is used in an environment where the opening pressure should be 500 p.s.i., the threaded sleeve 26 is raised by rotation in a suitable direction and the spring 16 is allowed to elongate. On the other hand, if the valve 10 is used in an environment where the opening pressure should be 1000 p.s.i., the threaded sleeve is forced downwardly to shorten the spring 16 and hence increase the spring force acting on the valve body 15.

The lock nut 28 and the wrench flats 29 are readily available for adjustment as desired. However, when the valve is typically installed, the opening pressure normally does not fluctuate radically and hence, a threaded cap 32 is joined to the neck 27 and a suitable O-ring 33 is placed between the two members. This protects the lock nut and threaded sleeve from tampering and the like.

A valve guide 36 is threaded about the valve seat 14 for positioning the valve body 15 when it moves upwardly and downwardly with a view of returning it to engagement with the valve seat. Briefly, the valve guide 36 includes a cylindrical threaded body which fully surrounds the valve seat 14 and which incorporate a perforated or slotted cylindrical member indicated by the numeral 36a which surrounds the valve body 15 to limit it to vertical movement. In the preferred embodiment, the upstanding member 36a is preferably perforated or slotted, and hence, of the 360° of escape for the pressure fluid when the valve is open, the valve guide means is little impediment, to the flow of the escaping pressure fluids. In some instances, the valve guide means controllably closes off the escape passage of the valve and serves as a blow-down ring to re-seat it at a desired pressure after opening. Consequently, the preferred embodiment utilizes the cylindrical body which is threaded to the valve seat 14 and a selected number of slots or openings as described above. The valve guide means 36a need not bear firmly against the valve body 15 but will sufficiently guide the valve body toward and away from the valve seat without binding and without permitting too much play or freedom in movement of the valve body. The valve guide is kept from turning by a set pin.

Attention is next directed to FIG. 2 for a more specific description of the features of the present invention. In FIG. 2, the valve seat 14 is shown in near relationship to the valve body 15 with the valve in a closed position. The valve seat 14 incorporates a tapered angular surface 14a which serves as the contact face in cooperation with the valve body 15 as will be described. The valve member 15 itself incorporates a central threaded opening and a bolt 15b is placed in the threaded opening. The bolt 15b positions a flat washer 15c against a plastic seal ring 15d to complete the assembly as shown in FIG. 2. The bolt 15b and flat washer 15c bear against the plastic seal to hold it in position on the working face of the valve body 15 and to thereby permit it to contact the valve seat face 14a. One edge of the plastic seal 15d contacts the face 14a and provides the line of closure for closing the valve.

The valve body 15 is formed with an encircling recessed groove 15e which aids in directing the turbulent pressure fluid outwardly and away from the valve seat when the valve opens. The groove 15e has been found particularly advantageous in lifting the valve member 15. Immediately adjacent to the groove 15e is a truncated surface or face 15f which terminates at the edge of the plastic seal 15d. The truncated face 15f is at a particular angle with respect to the axis of the valve body 15, but the angle is measurably different from the angle of the valve seat face 14a. As shown more clearly in the enlarged view of FIG. 3, the faces 15f and 14a do not mate, but rather provide a single line of contact as shown at 15g. This is particularly useful and advantageous in the event the plastic seal 15d wears measurably. While the metals used in the fabrication of the valve 10 may vary dependent on the hardness desired, it is, nevertheless, a foregone conclusion that the valve seat 14a and the valve body 15 will conventionally be formed of very tough, durable metals. Preferably, metals having a high degree of toughness and a minimum measure of wear are used.

The washer 15d is preferably formed of plastic material for positive seal which, while having many advantageous mechanical properties, nevertheless flows slightly to provide a slight degree of deformation or wear to eventually obtain the measure of wear shown in FIG. 3 after a period of useage. When the plastic seal 15d becomes worn to any degree, the valve body 15 contacts the valve seat 14 in the manner shown in FIG. 3, and the primary or principal line of contact of the closed valve 10 becomes the line of contact 15g shown in FIG. 3. As will be understood, this is not the least bit undesirable inasmuch as it provides a means for closing off the valve to leakage even after the seal 15d has worn.

The relative angle between the two angular faces need not be extreme, and may be about 15°. Other angles may be used.

The valve of the present invention is particularly easily serviced with a view of replacing the plastic seal 15d. Removal of the bolt 15b frees the plastic seal 15d for easy replacement. When the seal is replaced, the line of contact 15g shown in FIG. 3 is not established until the plastic member has worn or yielded sufficiently to net the metal to metal contact which provides the closure of the valve. It is particularly important to note that the present invention provides a first line of contact when the plastic seal 15d bears against the face 14a, this being relied upon for an extended period of time in the use of the present invention, and thereafter, in the event the plastic seal wears, the secondary line of closure 15g is established to likewise maintain the integrity of the valve.

Operation of the present invention will be discussed briefly, although it is believed that operation of safety or pop-off valves in general provides a suitable teaching describing the general operation of the present invention. As will be understood, pressure acts on the valve body 15 shown in FIG. 1, and forces it upwardly against the force of the spring 16 when the pressure becomes sufficiently great. In this event, the valve opens whereby the valve body 15 is separated from the valve seat 14. This vents some of the pressure fluid to atmosphere or to a safety collection line through the outlet opening 13 and reduces the pressure and thereby permits the valve 10 to close. The closing of the valve is initiated by the spring 16 which forces the valve body 15 back against the valve seat 14. When this is accomplished, the valve is closed against further communication to atmosphere or to the safety collection line. While the foregoing is generic to most safety valves, the safety valve of the present invention nevertheless incorporates the plastic seal 15d which contacts the seat face 14a to provide the closure of the valve. At some point in time, should the plastic member 15d wear as described above, the secondary but equally effective line of closure closes the valve and the pressure fluid is prevented from further escape or leakage.

The servicing of the present invention is particularly inexpensive inasmuch as a flat washer and standard bolt are used. Hence, replacement is not discouraged because of costs.

One of the several modifications which is readily adapted is the use of either threaded or flanged inlet, outlet and bonnet connections. Also, the threaded cap may be bolted to the valve structure.

The adjustment of the valve of the present invention has been described with relation to the threaded sleeve 26. Moreover, the general information regarding the use, installation, or servicing of the valve of the present invention is believed unduly extensive to require repetition in the present disclosure, which is primarily directed to the improved valve seat arrangement described herein. The terminology adopted in the body of the specification above is hereby adopted for the claims appended hereto.

What is claimed is:

1. A safety relief valve for fluid pressure which comprises:
   (a) a hollow fitting having an inlet adapted to be communicated with a source of pressure fluid;
   (b) an outlet;
   (c) a valve seat communicated by means of a passage with said inlet to permit pressure fluid to pass therethrough;
   (d) valve body means adapted to be placed in said valve seat for opening or closing controllably said passage permitting the pressure fluid to flow through said valve seat;
   (e) a plastic seal member carried on said valve body means and adapted to be contacted against said valve seat for closing said valve seat against the flow of pressure fluid from said inlet to said outlet;
   (f) said valve seat being tapered at a predetermined angle;
   (g) an opposing tapered face on said valve body means immediately adjacent to the plastic seal carried thereon and tapered at an angle different from the angle of the face on said valve seat and being further adapted to be contacted against the face of said valve seat after contact of the plastic seal thereagainst along an encircling line of contact;
   (h) a removable bolt and washer means for securing said plastic seal member to said valve body means;
   (i) said plastic seal member being of finite thickness and a deformable material in comparison to the material of said valve seat, and extending sufficiently from the face of said valve body means to first contact said valve seat and prevent said valve body means from contact thereagainst until after said plastic seal member has worn at the point of contact against said valve seat, said valve body means only then coming into sealing contact with said valve seat at a point different from that contacted by said plastic seal member;
   (j) a valve spring urging said valve body means toward said valve seat means;
   (k) valve guide means encircling said valve seat, said means being threadedly mounted thereto for movement relative to said valve seat such that said valve guide means is extended a controllable distance above said valve seat means;
   (l) a set screw carried by said hollow fitting and movable to a locking relationship with respect to said valve guide means;
   (m) said valve guide means including upstanding members separated by spaces, the spaces being less than the width of said valve body means and the height of said members exceeding the range of movement of said valve body means in movement against said valve spring; and,
   (n) said valve fitting having a surrounding open space adjacent said valve seat which opens into said outlet for venting pressure fluid past said valve body means toward said outlet.

2. The invention of claim 1 wherein the angle between the faces on said valve body means and said valve seat is approximately 15°, the contact is an encircling line of contact.

References Cited

UNITED STATES PATENTS

| | | | |
|---|---|---|---|
| 1,792,945 | 2/1931 | Van Deventer | 251—357X |
| 2,485,092 | 10/1949 | Gannon | 251—357X |
| 2,929,401 | 3/1960 | Cowan | 251—333X |
| 3,044,743 | 7/1962 | Siegel | 251—332 |
| 3,071,153 | 1/1963 | Cornelius | 137—516.29 |
| 3,211,174 | 10/1965 | Weise et al. | 137—469 |

ALAN COHAN, Primary Examiner

D. R. MATTHEWS, Assistant Examiner

U.S. Cl. X.R.

137—469, 516.29, 543.13; 251—332, 333, 357